R. L. FORD.
SEED PLANTER.
APPLICATION FILED MAR. 6, 1917.
1,284,290.
Patented Nov. 12, 1918.
2 SHEETS—SHEET 2.
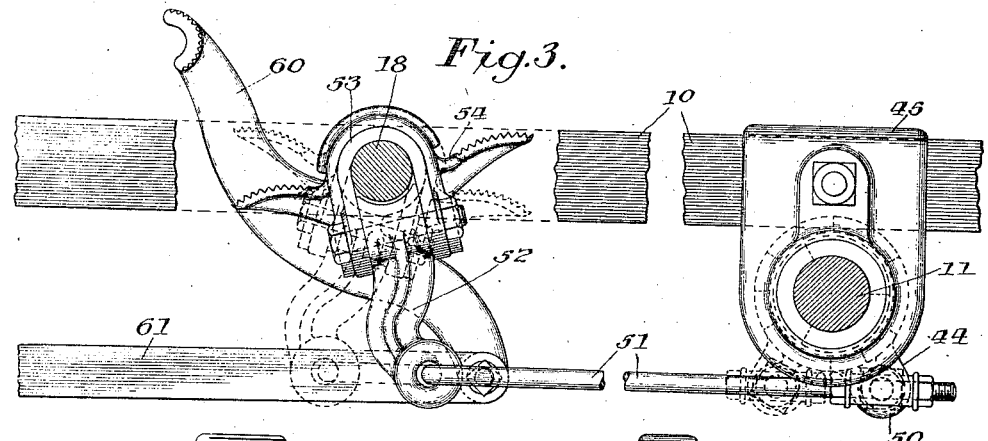
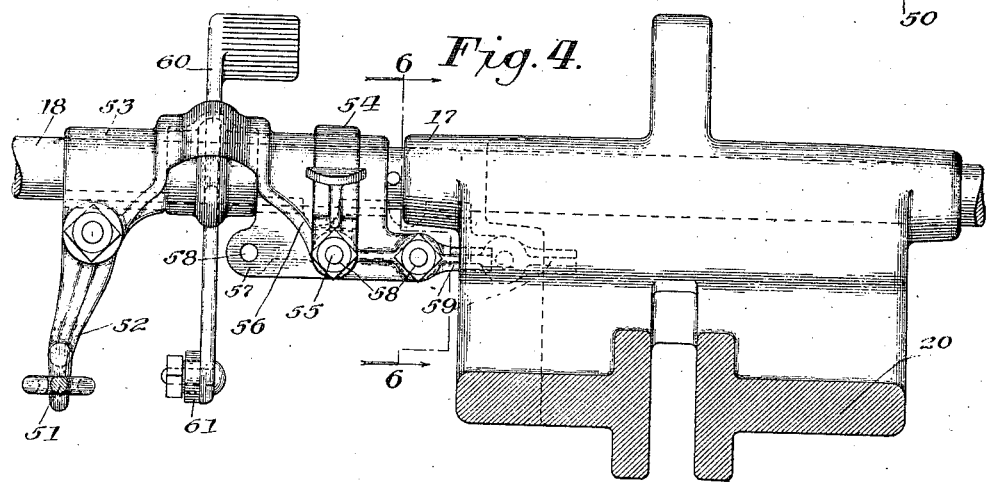
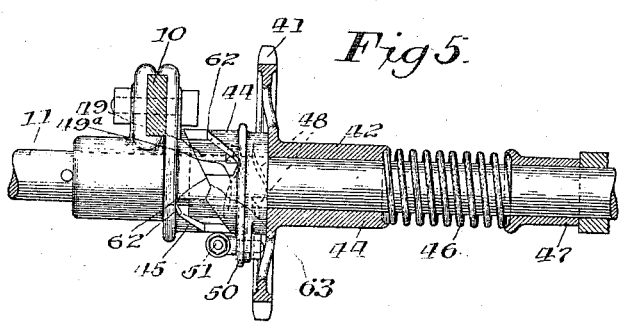
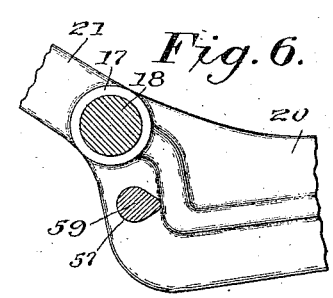
Inventor:
Ralph L. Ford,
by Chas. E. Lord
Atty.

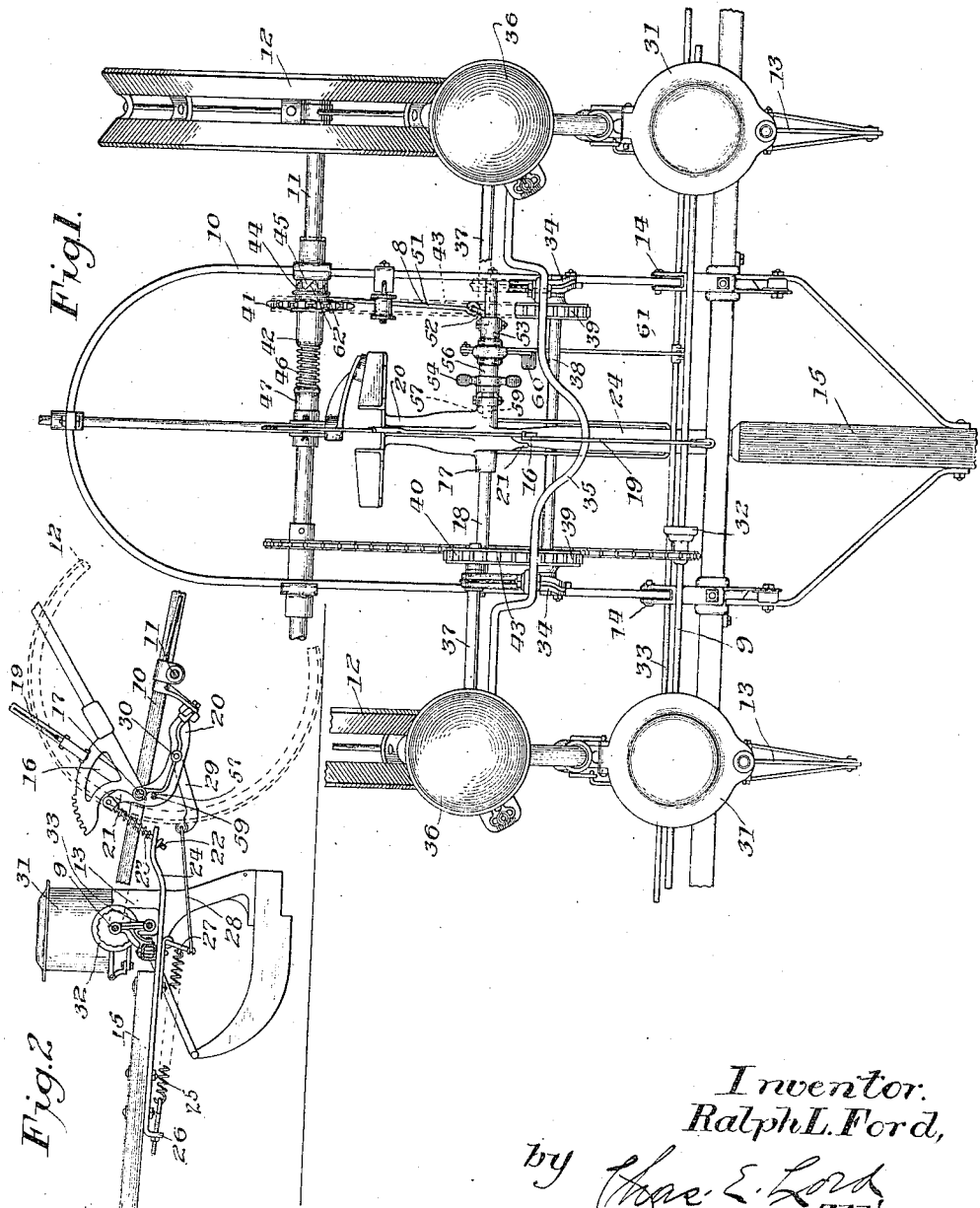

UNITED STATES PATENT OFFICE.

RALPH L. FORD, OF CHICAGO, ILLINOIS, ASSIGNOR TO INTERNATIONAL HARVESTER CORPORATION, A CORPORATION OF NEW JERSEY.

SEED-PLANTER.

1,284,290.

Specification of Letters Patent.

Patented Nov. 12, 1918.

Application filed March 6, 1917. Serial No. 152,763.

*To all whom it may concern:*

Be it known that I, RALPH L. FORD, a citizen of the United States, residing at Chicago, in the county of Cook and State of Illinois, have invented certain new and useful Improvements in Seed-Planters, of which the following is a full, clear, and exact specification.

My invention relates to seed planters and more especially to planters provided with fertilizer distributing attachments.

The invention has among its objects to provide means whereby the operator may easily throw out the driving connection for the fertilizer attachment simultaneously with the raising of the furrow opening shoes or independently thereof.

These objects are accomplished by means of improved clutch and tripping mechanism therefor operable by the raising and lowering lever for the furrow opening shoes and also operable independently thereof by means of a foot treadle.

In the drawings I have illustrated one embodiment of my invention, and in these drawings—

Figure 1 is a top plan view of a planter having my improved mechanism mounted thereon;

Fig. 2 is a side elevation on a smaller scale of the planter shown in Fig. 1, illustrating more particularly the raising and lowering mechanism for the furrow openers;

Fig. 3 is a side elevation on an enlarged scale of the clutch mechanism and the treadle operating means therefor shown in Fig. 1;

Fig. 4 is a front elevational view of the structure shown in Fig. 3;

Fig. 5 is an enlarged detail of the clutch mechanism; and

Fig. 6 is a sectional view taken substantially on line 6—6 of Fig. 4 and looking in the direction of the arrow.

The planter illustrated in the accompanying drawings comprises a supporting U-shaped frame 10 mounted upon an axle 11 carried by supporting wheels 12, a runner or furrow opener frame 13 hingedly connected to the supporting frame 10 at 14, a draft tongue 15 connected to both of said frames, and an adjusting lever 16 integral with the sleeve 17 carried by a transverse shaft 18 secured to the U-shaped supporting frame intermediate its ends. The frame adjusting lever is preferably in the form of a bell crank and comprises an upwardly extending hand portion 19, a rearwardly extending foot portion 20, and a forwardly extending lug 21. For raising the runner frame, a yielding connection is formed between the forwardly extending lug 21 and said runner frame and comprises a rod 22 carrying a pressure spring 23 pivoted at its upper end to the forwardly extending lug, and at its lower end slidably received in a brace bar 24 fixed to the runner frame 13 and to the tongue 15. To assist the operator in moving the lever to raise the runner frame, I provide a counterbalancing spring 25 adjustably secured at 26 to the tongue 15 and connected at its opposite end to a depending arm 27 carried by the brace bar, said arm in turn being connected by means of a link 28 to a second link 29, which in turn is pivotally connected at 30 to the rearwardly extending portion 20 of the lifting lever. A seed shaft 9 is mounted on the runner frame and is operatively connected to seed plates carried by the seed boxes 31. The seed shaft and the seed plates are operated in the usual manner through the ordinary intermittent corn planter clutch mechanism 32 carried by the shaft 9, said clutch mechanism being thrown into operation by means of a trip shaft 33, which in turn is operated by tappets carried by the usual check wire in a manner understood by those familiar with the art. For supporting the fertilizer distributer attachment, I have provided brackets 34 secured to the U-shaped supporting frame in advance of the shaft 18, and these brackets 34 support a transverse brace rod 35 which carries at each end a hopper 36 for the fertilizer. These hoppers are provided with the usual distributing plates operated by means of shafts 37 carried by the transverse brace rod 35. An idler shaft 38 is journaled in the brackets 34 forwardly of the shafts 37 and carries at each end an idler sprocket 39. These sprockets 39 are vertically alined with sprockets 40 fixed to the shafts 37 and at one side of the machine the sprockets 39 and 40 are alined with a sprocket 41 carried by a sleeve or hub 42, the sprockets 39, 40 and 41 being operatively connected by a chain 43. Journaled on the axle 11 for intermittently connecting the sprocket 41 and sleeve 42 with the axle 11, I have provided a clutch comprising members 44 and 45, the former consisting of a collar or sleeve journaled on and bearing against the sprocket hub, and the latter being fixed to frame 10 and integral with the bearing for the axle 11. The sleeve 42, the sprocket 41 and clutch member 44 are normally spring-pressed into engagement with the clutch member 45 by means of a spring 46 mounted on the axle 11 and engaging at one end the sleeve 42 and at its opposite end a collar 47 secured to said axle. The sprocket sleeve or hub 42 is provided with annular clutch teeth 48 which surround the axle 11 and are positioned between the member 44 and said axle, and positioned between the clutch member 45 and axle 11 I have a member 49 fixed to the axle 11 and provided with teeth 49ª adapted to mesh with teeth 48. The member 44 is also provided with a depending ear 50, to which is pivotally and adjustably connected a link 51, by means of which the clutch is actuated in a manner hereinafter described. The front end of the link 51 is pivotally secured to a depending crank arm 52 carried by a sleeve 53 journaled on the transverse shaft 18. For the purpose of rotating this sleeve 53 and thereby operating the clutch mechanism on the axle 11, I have secured to said sleeve a treadle 54 secured by a bolt 55 to depending flanges 56 carried by the sleeve. Also adjustably carried by these flanges 56 below the shaft 18 is a member 57 provided with a plurality of horizontally alined apertures 58 and also provided on its inner end with a lug 59. This lug 59 extends inwardly from the sleeve 53 and overlaps the depending portion 20 integral with the raising and lowering lever 16 which operates the runner frame 13. The object of providing the member 57 with a plurality of apertures is to adapt the mechanism for use in wide and narrow frame planters, the member 57 being adjustable, as shown in dotted line positions in Fig. 4. The transverse shaft 18 has also journaled thereon, a treadle or lever 60 carrying at its lower end the forwardly extending link 61, this link being connected to the trip shaft 33 for the purpose of changing the machine from a check row planter to a drill planter in a manner well known to those familiar with the art.

In the operation of the device, if it is desired to raise the shoes and simultaneously throw out the clutch for the fertilizer distributing mechanism, the operator releases the hand lever 19 from the quadrant teeth in the usual manner and pulls the same rearwardly to the position shown in Fig. 2. By thus manipulating the hand lever, the furrow opening shoes are raised through the extension 21, link 22 and brace bar 24, this operation being aided by means of the counterbalancing spring 25. As the lever is thus pulled rearwardly, the depending portion 20 thereof will contact with the lug 59 carried by the member 58 and will therefore rotate the sleeve 53 on the shaft 18, pulling forwardly the link 51. As a forward pull is exerted on this link, the clutch member 44 will be rotated with respect to the axle 11 and the teeth carried by the clutch member 44 will ride upwardly on the opposing teeth carried by the clutch member 45 and will force the clutch teeth 48 out of mesh with the corresponding and opposing clutch teeth 49ª, thereby disconnecting the driving connection between the main axle and the shaft 37 which drives the fertilizer distributer. When the operator desires to continue the planting, the lever 19 is pushed forwardly and the mechanism will be operated in the reverse order, the spring 46 forcing the clutch members 44 and 45 and clutch teeth 48 and 49ª again into contact with each other, thereby driving the fertilizer distributing shaft 37.

If for any reason the operator of the machine desires to continue the planting but to discontinue the distributing of the fertilizer, he will press on the treadle 54, thereby rotating the sleeve 53 and pulling forwardly on the link 51. As a forward pull is exerted on this link, the teeth on the clutch member 44 will ride upwardly on the corresponding teeth of the clutch member 45, in this instance continuing their relative movement until the apexes of these teeth are opposite each other, in which condition the concave surface 62 on the teeth carried by the member 45 will receive a convex surface 63 carried by the opposing teeth and the clutch members will remain in this position, maintaining the clutch teeth 48 and 49ª out of contact with each other until the foot treadle 54 is again operated and the clutch is thrown into mesh by means of the sleeve 53, crank arm 52, and link 51.

From the above description it will be seen that I have provided means whereby the operator can throw the fertilizer distributing attachment out of operation simultaneously with the raising of the furrow opening shoes and the discontinuance of the operation of the seed planting mechanism, or can throw said fertilizer distributing attachment out of operation independently of the seed planting mechanism. It will, moreover, be seen that the same parts have been utilized in both cases for throwing out the fertilizer distributing clutch, the connection between the two mechanisms being made through the lug 59 carried by the member 57 secured to the sleeve 53. By thus using the same mechanism in both operations, I have simplified the construction and avoided any unnecessary duplication of parts. Attention is also called to the fact that the mechanism for independently throwing the fertilizer distributing attachment out of operation is mounted entirely on the main frame of the planter and is not affected in any way by the adjustments of the runner frame.

While I have in the above specification described one embodiment of my invention, it is to be understood that the structure shown is merely for the purpose of illustration and may be modified without departing from the spirit of the invention as set forth in the following claims.

What I claim as new, and desire to secure by Letters Patent, is:

1. In a seed planter, a supporting frame, a furrow opener frame hinged thereto, a drive shaft, a supplemental shaft, a fertilizer distributing mechanism carried by said supporting frame, means carried by said supplemental shaft for adjusting said furrow opener frame with relation to said supporting frame, operative driving connections including a clutch between said drive shaft and said distributing mechanism, and means carried by said supplemental shaft and located in the path of said adjusting means for controlling said clutch.

2. In a seed planter, a supporting frame, a furrow opener frame adjustably carried thereby, a drive shaft, a supplemental shaft, fertilizer distributing mechanism carried by said supporting frame, means carried by said supplemental shaft for adjusting said furrow opener frame with relation to said supporting frame, operative driving connections including a clutch between said drive shaft and said distributing mechanism, and adjustable means carried by said supplemental shaft and located in the path of said adjusting means for controlling said clutch.

In testimony whereof I affix my signature.

RALPH L. FORD.

Copies of this patent may be obtained for five cents each, by addressing the "Commissioner of Patents, Washington, D. C."